(12) United States Patent
Koran (10) Patent No.: US 10,275,793 B2
(45) Date of Patent: Apr. 30, 2019

(54) CONTENT DELIVERY SYSTEM USING NATURAL QUERY EVENTS

(71) Applicant: EXCALIBUR IP, LLC, New York, NY (US)

(72) Inventor: Joshua M. Koran, Mountain View, CA (US)

(73) Assignee: EXCALIBUR IP, LLC, New York, NY (US)

( * ) Notice: Subject to any disclaimer, the term of this patent is extended or adjusted under 35 U.S.C. 154(b) by 303 days.

(21) Appl. No.: 14/256,577

(22) Filed: Apr. 18, 2014

(65) Prior Publication Data
US 2014/0229282 A1    Aug. 14, 2014

Related U.S. Application Data

(63) Continuation of application No. 11/801,024, filed on May 8, 2007, now Pat. No. 8,712,844.

(51) Int. Cl.
*G06Q 30/02* (2012.01)

(52) U.S. Cl.
CPC ......... *G06Q 30/0256* (2013.01); *G06Q 30/02* (2013.01); *G06Q 30/0277* (2013.01)

(58) Field of Classification Search
CPC .... G06Q 30/00; G06Q 30/02; G06Q 30/0241; G06Q 30/0251; G06Q 30/0256
USPC ........................................... 705/14.25, 14.54
See application file for complete search history.

(56) References Cited

U.S. PATENT DOCUMENTS

| | | | | |
|---|---|---|---|---|
| 5,974,396 | A * | 10/1999 | Anderson | G06Q 30/02 705/14.25 |
| 7,047,251 | B2 * | 5/2006 | Reed | G06Q 30/02 |
| 2006/0149625 | A1 * | 7/2006 | Koningstein | G06Q 30/02 705/14.54 |
| 2008/0040329 | A1 * | 2/2008 | Cussen | G06F 17/30867 |

* cited by examiner

*Primary Examiner* — Marilyn G Macasiano
(74) *Attorney, Agent, or Firm* — James J. DeCarlo; Greenberg Traurig, LLP (57) ABSTRACT

A system and method to identify targeting criteria for online advertising campaigns based on natural query event data are described. A request to determine targeting criteria is received from an advertiser entity. Natural or algorithmic query event data related to the advertiser entity is retrieved from a data storage module. Attribute data associated with targeted customers is extracted based on the retrieved natural query event data. Finally, the attribute data is further processed to determine a set of criteria to target advertisements to the customers.

24 Claims, 7 Drawing Sheets

CONTENT DELIVERY SYSTEM USING NATURAL QUERY EVENTS

CROSS REFERENCE TO RELATED APPLICATIONS

This application is a continuation of, and claims priority from, co-pending U.S. patent application Ser. No. 11/801,024, filed May 8, 2007, entitled USE OF NATURAL QUERY EVENTS TO IMPROVE ONLINE ADVERTISING CAMPAIGNS, the contents of which are incorporated herein by reference.

TECHNICAL FIELD

The present invention relates generally to computer applications and, more particularly, to a system and method to identify targeting criteria for online advertising campaigns based on natural query event data.

BACKGROUND OF THE INVENTION

Marketing is the art of reaching the right customer or consumer, with the right message at the right time. Since marketers cannot afford to craft unique messages for each targeted individual, they always deal with large segments of their target market at any given time.

An efficient system of targeting advertisements can improve a marketer's return on the advertising budget. However, the learning curve in determining such targeting parameters for any given product or brand is expensive and time consuming. If the marketers have a history of targeting actions, they can analyze the previous results to determine which permutations of targeting criteria have worked in the past. Otherwise, the marketers may be unable to predict if the price premium is worth paying for a certain set of targeting criteria. Moreover, an exclusive focus on targeting criteria of past campaigns may lead to reinforcement of inefficient choices.

Thus, what is needed is a system and method to identify targeting criteria for online advertising campaigns based on natural query event data in order to improve the overall effectiveness of the advertisements.

SUMMARY OF THE INVENTION

A system and method to identify targeting criteria for online advertising campaigns based on natural query event data are described. A request to determine targeting criteria is received from an advertiser entity. Natural or algorithmic query event data related to the advertiser entity is retrieved from a data storage module. Attribute data associated with targeted customers is extracted based on the retrieved natural query event data. Finally, the attribute data is further processed to determine a set of criteria to target advertisements to the customers.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A system and method to identify targeting criteria for online advertising campaigns based on natural query event data are described.

Figure 1:
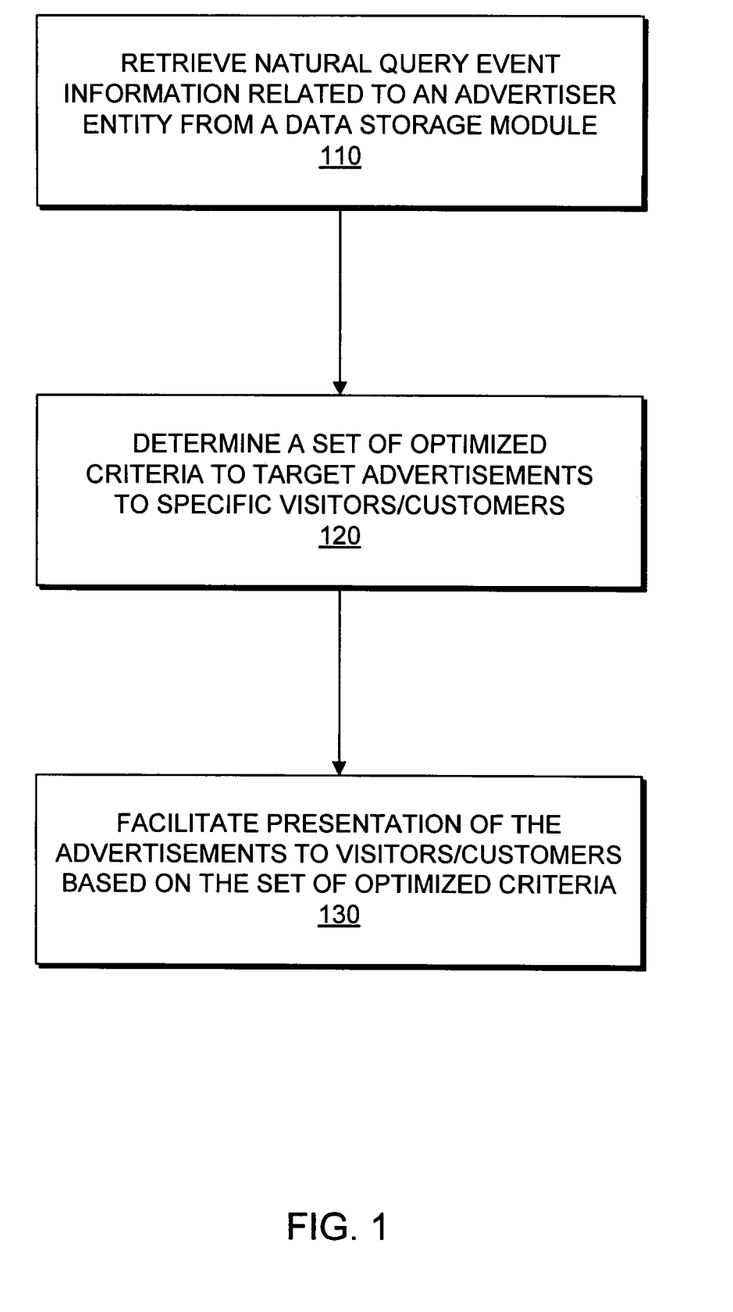
FIG. 1 is a flow diagram illustrating a processing sequence to facilitate identification of targeting criteria for online advertising campaigns based on natural query event data and presentation of advertisements to customers, according to one embodiment of the invention.

FIG. 1 is a flow diagram illustrating a processing sequence to facilitate identification of targeting criteria for online advertising campaigns based on natural query event data and presentation of advertisements to customers. As shown in FIG. 1, at processing block 110, the sequence starts with retrieval of natural query event information related to an advertiser entity within a specific industry. In one embodiment, the user or advertiser connects to an entity, which contains a system to identify targeting criteria and to present advertisements to visitors/customers of the entity, and transmits a request to determine targeting criteria, as described in further detail below. Alternatively, the advertiser may connect to the entity via a network to transmit the request to display the targeting criteria. In response to the request, the entity retrieves associated natural, also known as algorithmic, query event information from a corresponding data storage module, such as, for example, natural search queries performed by visitors/customers in a predetermined period of time.

Next, at processing block 120, a set of optimized criteria to target advertisements to specific visitors/customers is determined. In one embodiment, the entity receives the request and optimizes the retrieved natural query event information to determine one or more targeting criteria for subsequent presentation of advertisements, as described in further detail below.

Finally, at processing block 230, presentation of the advertisements to the visitors/customers is facilitated based on the set of optimized criteria. In one embodiment, the entity displays the set of optimized targeting criteria to the advertiser and the advertiser further instructs the entity to present predetermined advertisements to the visitors/customers with attributes matching the selected targeting criteria, as described in further detail below. Alternatively, the entity generates automatically a selection of advertisements based on the targeting criteria and presents the advertisements to the specific visitors/customers, as described in detail below.

Figure 2:
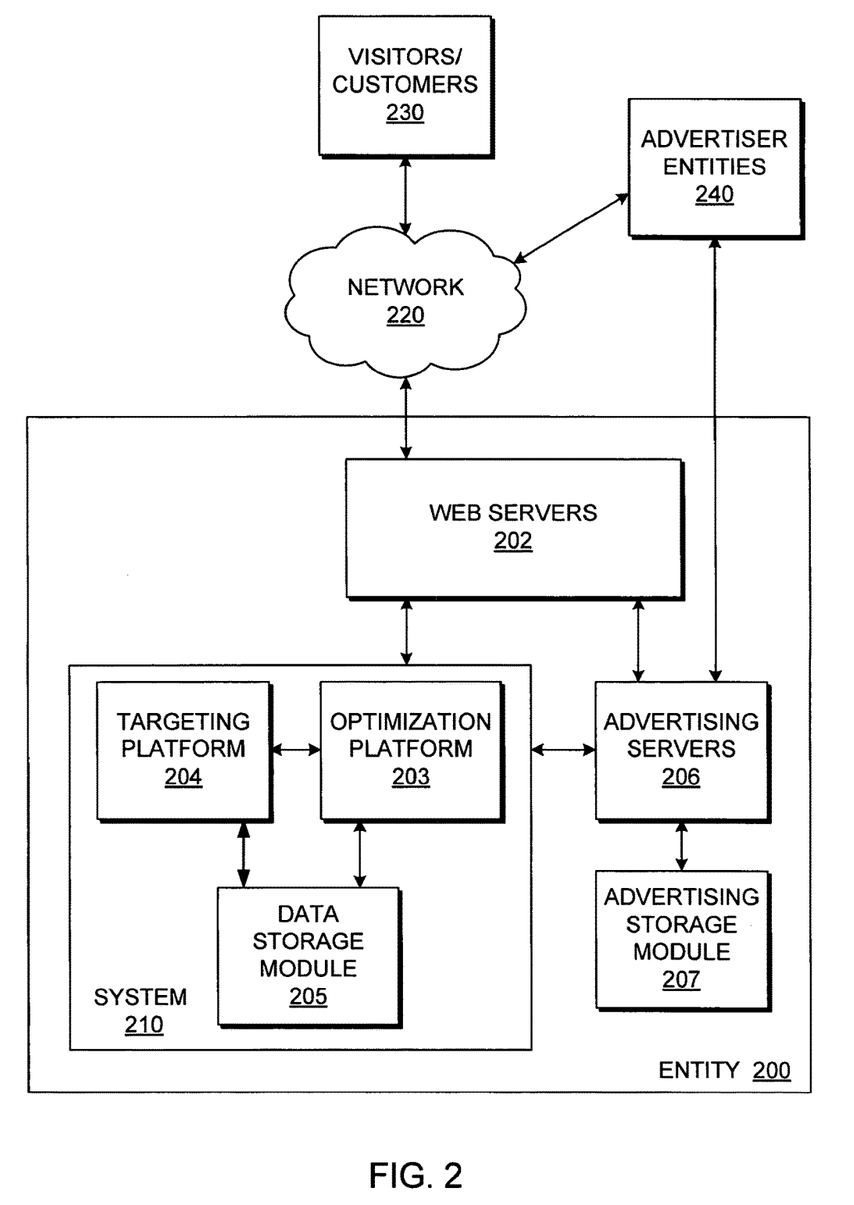
FIG. 2 is a block diagram illustrating an exemplary entity containing a system to facilitate identification of targeting criteria for online advertising campaigns based on natural query event data and presentation of advertisements to customers, according to one embodiment of the invention.

FIG. 2 is a block diagram illustrating an exemplary entity containing a system to facilitate identification of targeting criteria for online advertising campaigns based on natural query event data and presentation of advertisements to customers. While an exemplary embodiment of the present invention is described within the context of an entity 200 enabling such identification and presentation operations, it will be appreciated by those skilled in the art that the invention will find application in many different types of computer-based, and network-based, entities.

In one embodiment, the entity 200, such as, for example, an Internet portal, includes one or more front-end web servers 202, which may, for example, deliver web pages to multiple visitors or customers 230, (e.g., markup language documents), handle search requests or queries to the entity 200, provide automated communications to/from visitors/customers 230 of the entity 200, deliver images to be displayed within the web pages, deliver content information to the visitors/customers 230, and other interface operations in connection with the visitors/customers 230. In one embodiment, the front-end web servers 202 are further configured to provide interface capabilities to one or more users 240, such as, for example, advertiser entities, marketers, or other users of applications residing within the entity 200, and to enable such users 240 to communicate with the entity 200, either directly or through a network 220. Alternatively, the entity 200 may include a number of additional front-end servers (not shown), which provide an intelligent interface to the back-end of the entity 200.

In one embodiment, the entity 200 further includes one or more back-end servers coupled to the front-end web servers 202, such as, for example, advertising servers 206, and other processing servers, such as, for example, database processing servers (not shown), and a system 210 to facilitate identification of targeting criteria for online advertising campaigns and presentation of advertisements, as described in further detail below, the system 210 being coupled to the front-end web servers 202 and the advertising servers 206. In one embodiment, the advertising servers 206 are further coupled to one or more advertising storage modules 207, which are configured to store advertisements for presentation to visitors/customers 230.

In one embodiment, the system 210 further includes an optimization platform 203 coupled to a data storage module 205 and a targeting platform 204. The optimization platform 203 may include software and/or hardware modules configured to perform identification and presentation operations, as described in further detail below. The targeting platform 204 may include software and/or hardware modules configured to perform automated targeting of advertisements, as described in detail below.

The data storage module 205, which at least partially implements and supports the system 210, may include one or more storage facilities, such as a database or collection of databases, which may be implemented as relational databases. Alternatively, the data storage module 205 may be implemented as a collection of objects in an object-oriented database, as a distributed database, or any other such databases. The data storage module 205 is accessible by the optimization platform 203 and stores natural query event data related to the advertiser entities 240 and attribute data related to the visitors/customers 230, as described in further detail below.

In one embodiment, the visitors/customers 230 and the users/advertisers 240 may access the entity 200 through respective client machines (not shown) coupled to the visitors/customers 230 and the users/advertisers 240 or, in the alternative, through respective client programs, such as a browser (e.g., the Internet Explorer browser distributed by Microsoft Corporation of Redmond, Wash.), that executes on each client machine and accesses the entity 200 via the network 220, such as, for example, the Internet. Other examples of networks that a client machine may utilize to access the entity 200 includes a wide area network (WAN), a local area network (LAN), a wireless network (e.g., a cellular network), the Plain Old Telephone Service (POTS) network, or other known networks.

Figure 3:
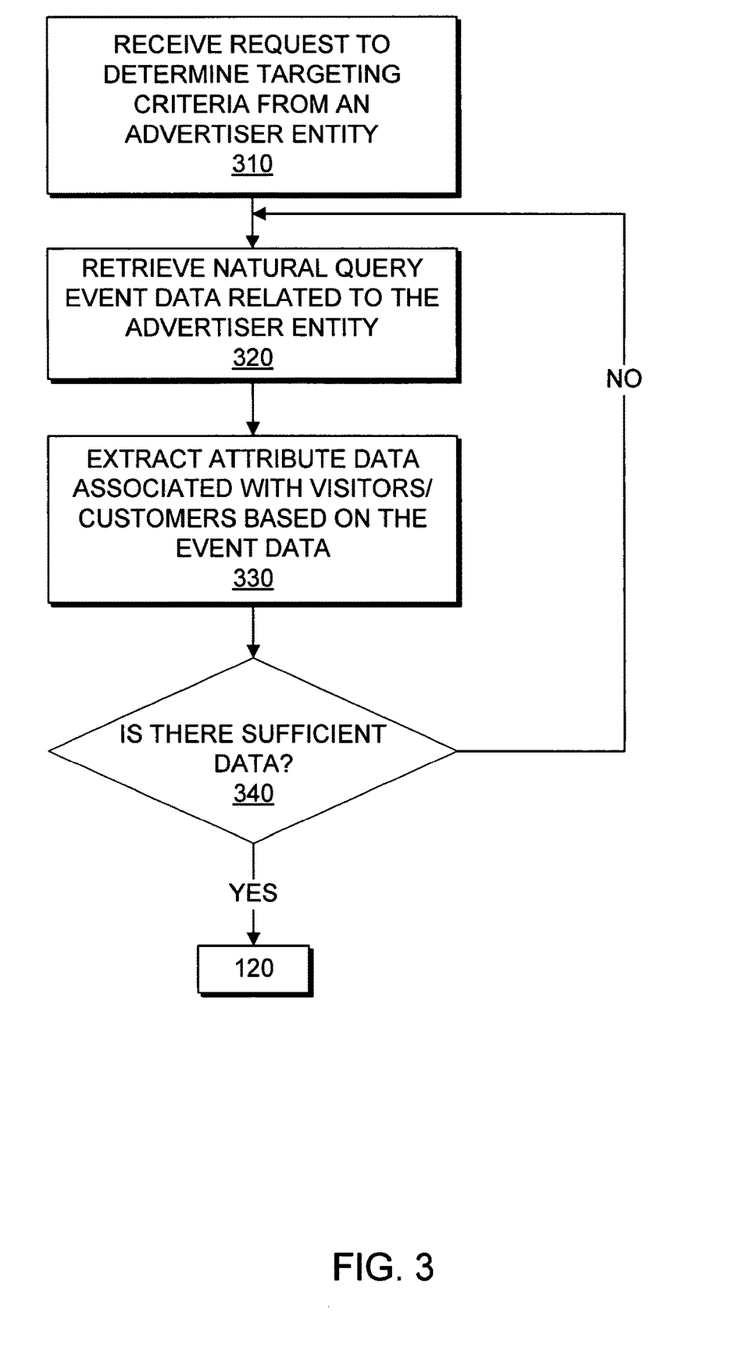
FIG. 3 is a flow diagram illustrating a method to identify attribute data related to customers, according to one embodiment of the invention.

FIG. 3 is a flow diagram illustrating a method to identify attribute data related to customers, according to one embodiment of the invention. As shown in FIG. 3, at processing block 310, a request to determine a set of criteria to target advertisements to specific customers is received. In one embodiment, a user, such as, for example, the advertiser entity 240, connects directly to the advertising servers 206 within the entity 200 and transmits a request to determine the targeting criteria and to receive recommendations of criteria necessary to accomplish specific advertising goals, such as, for example, acquisition, branding, direct response, retention, and/or monetization. Alternatively, the advertiser entity 240 may connect to the web servers 202 within the entity 200 via the network 220 to transmit the request to determine the targeting criteria.

At processing block 320, natural query event data related to the advertiser entity 240 is retrieved from the data storage module 205. In one embodiment, the optimization platform 203 within the system 210 accesses event logs (not shown) within the data storage module 205 to retrieve event information logged by the entity 200 in a predetermined period of time. In one example, such events include natural (algorithmic) search queries initiated by visitors/customers 230 for search keywords linked to multiple uniform resource locator (URL) links associated with the advertiser entity 240 and subsequent search clicks on the advertiser's URL links within the predetermined period of time, such as, for example, a month, week, or a 24-hour period. In one embodiment, the stored data includes a time stamp parameter indicating the time of the event, the advertiser's URL link, and a cookie or other identification parameter associated with each respective visitor/customer 230.

At processing block 330, attribute data associated with the visitors/customers 230 is extracted from the data storage module 205 based on the retrieved natural query event data. In one embodiment, the optimization platform 203 accesses respective storage facilities within the data storage module 205 to extract attribute data associated with each visitor/customer 230 based on the corresponding cookie or other identification parameter retrieved from the event logs. In one embodiment, attribute data may include, for example, demographic information, such as gender, age, occupation of targeted visitors/customers 230, technographic information, such as the equipment used, the type of client browser and operating system, Internet Protocol (IP) address and mapping to geographical information, context information, such as data obtained while visitors/customers 230 are present on a particular web site, inferred profile information, such as data obtained from a behavioral targeting system, which monitors and registers the activities and behavior of visitors/customers 230 while accessing various web sites, and timing information, such as the time of day or the day within a week when visitors/customers 230 respond favorably to targeted advertisements.

Finally, at processing block 340, a decision is made whether there are sufficient natural query event data and attribute data for further processing to identify targeting criteria for the advertiser entity 240. In one embodiment, the optimization platform 203 analyzes the retrieved event data and attribute data and counts the cookies or other known identification parameter linked to the visitors/customers 230 to determine if sufficient data is available for further processing. If there is sufficient data, then the procedure jumps to processing block 120 described in detail in connection with FIGS. 1 and 4. Otherwise, if more data needs to be extracted, processing blocks 320 and 330 are repeated and either more data is selected or the time period is adapted to include additional stored data.

Figure 4:
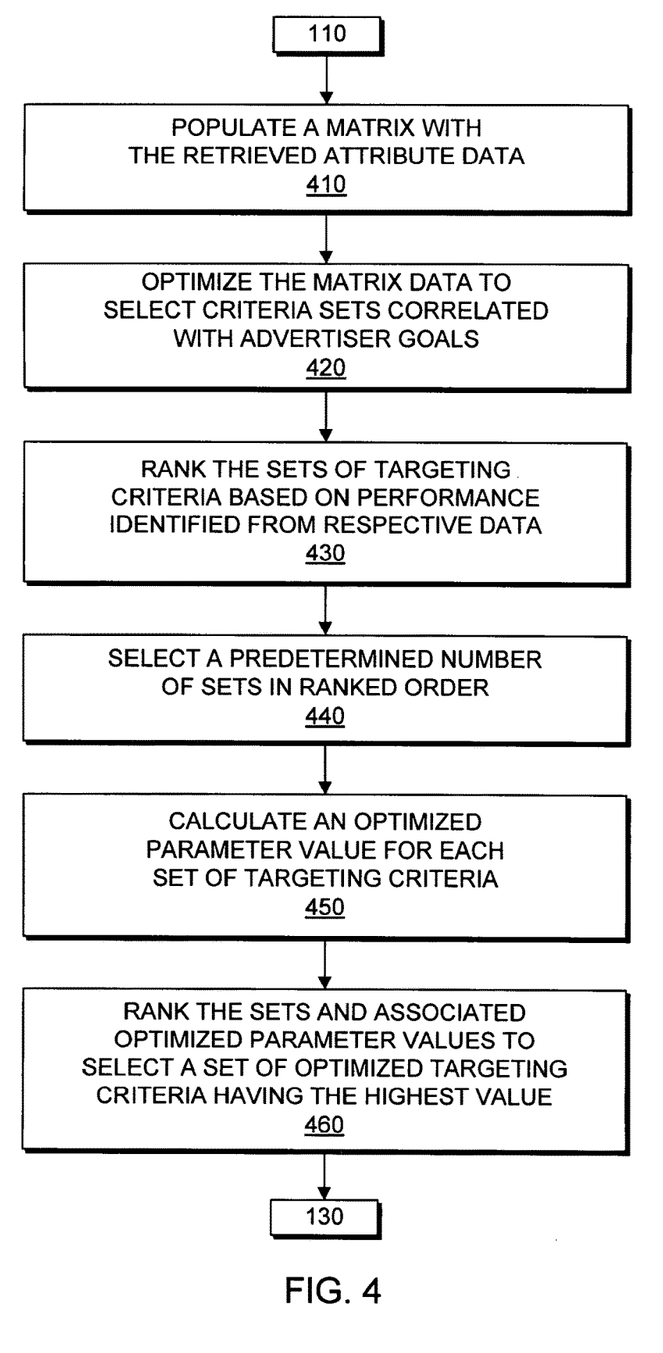
FIG. 4 is a flow diagram illustrating a method to select a set of optimized criteria to target advertisements to specific customers, according to one embodiment of the invention.

FIG. 4 is a flow diagram illustrating a method to select a set of optimized criteria to target advertisements to specific customers, as presented at processing block 120 of FIG. 1. It is to be understood, however, that other known methods to select optimized targeting criteria based on natural query event data and related customer attribute data may be used without departing from the scope of the present invention.

As shown in FIG. 4, at processing block 410, a matrix is populated with the retrieved advertiser targeting data and the respective competitor targeting data. In one embodiment, the optimization platform 203 within the entity 200 receives the retrieved attribute data and populates a matrix, such as, for example, a permutation matrix, which contains the user/advertiser information, the visitors/customers information and the corresponding attribute data.

At processing block 420, sets of targeting criteria highly correlated with the goals of the advertiser entity 240 are selected. In one embodiment, the optimization platform 203 applies one of many known optimization algorithms, such as, for example, a clustering algorithm or a segmentation algorithm, to optimize the matrix and to select the sets of targeting criteria. The targeting criteria may include, for example, demographic criteria, technographic criteria, geographical criteria, contextual criteria, customer profile criteria, and/or timing criteria, as described in further detail above. In an alternate embodiment, the optimization platform 203 selects the sets of targeting criteria from the entire body of data stored within the matrix.

In one embodiment, if the advertisements are sponsored listings, a matrix of keywords by all advertisers in a competitive set by click-through-rate parameter (CTR) is created. The CTR parameter may include clicks from natural search events, sponsored search events, or a combination of both. The keywords having a highest CTR value and/or a best cost-per-click (CPC)/CTR ratio (e.g., a high ratio like {$2 CPC/1% CTR} is worse than the lower ratio {$1 CPC/1% CTR}) are selected for further recommendation to the advertiser entity 240. Any keywords currently bid on by a specific advertiser entity 240 are marked, such that they can be filtered from any further recommendation.

In an alternate embodiment, if the advertisements are graphical ads part of a graphical ad campaign, the set of advertisements having a minimum number of clicks is used to identify direct-response campaigns. For these campaigns, a matrix of targeting data by all advertisers in a competitive set by the CTR parameter is created. The sets of targeting criteria having a highest CTR value and/or a CTR/CPM ratio are selected for further recommendation to the advertiser entity 240. Any targeting criteria currently purchased by the advertiser entity 240 are marked in order to be filtered from any further recommendation.

In one example, considering a product manufacturer X, such as, for example, an automobile manufacturer, the optimization platform 203 may reduce the dimensionality of the matrix by using the gender information, the age information, the geographical information, and the direct response information retrieved from a behavioral targeting system, all stored within the matrix to obtain a number of sets of targeting criteria, as follows:
   a. Female, 35-45 years old;
   b. Female, BTS/Direct Response, luxury autos;
   c. Female, 18-25 years old, living in the 90210 zip code;
   etc.

At processing block 430, the sets of targeting criteria are ranked based on performance adapted to the goals of the user/advertiser 240. In one embodiment, the optimization platform 203 ranks the selected criteria sets based on historical performance when presented to targeted visitors/customers within the network 220.

At processing block 440, a predetermined number of criteria sets are selected. In one embodiment, the optimization platform 203 considers only a predetermined number of highly ranked sets for further processing. In an alternate embodiment, the optimization platform 203 may process all the ranked sets of targeting criteria. In the example detailed above, the optimization platform 203 ranks the sets of targeting criteria and selects the top three sets as follows:
   1. Female, 35-45 years old;
   2. Female, BTS/Direct Response, luxury autos;
   3. Female, 18-25 years old, living in the 90210 zip code.

At processing block 450, an optimized parameter value is calculated for each set of targeting criteria as a function of the associated performance and a cost parameter value. In one embodiment, the optimization platform 203 multiplies the performance parameters retrieved for each set of targeting criteria with a cost parameter value, which represents the amount of money necessary to target the respective set, for example, 35-45 year-old females. Each resulting optimized parameter value is further assigned to the corresponding set of targeting criteria.

At processing block 460, the criteria sets and their respective optimized parameter values are further ranked to select the optimized set of targeting criteria associated with the highest calculated optimized parameter value. In one embodiment, the optimization platform 203 subsequently ranks the sets based on their respective optimized parameter values and selects the optimized set of targeting criteria associated with the highest calculated optimized parameter value. The procedure then jumps to processing block 30 shown in connection with FIG. 2.

In the above example, if the cost parameters and the assigned optimized parameter values are calculated as follows, then the new ranking may be assembled as follows:
   1. Female, 35-45 years old, $10.00, optimized value "x";
   2. Female, 18-25 years old, living in the 90210 zip code, $5.00, "z";
   3. Female, BTS/Direct Response, luxury autos, $15.00, "y".

Therefore, the selected highest ranked optimized set of targeting criteria for the automobile manufacturer X is (Female, 35-45 years old).

Figure 5:
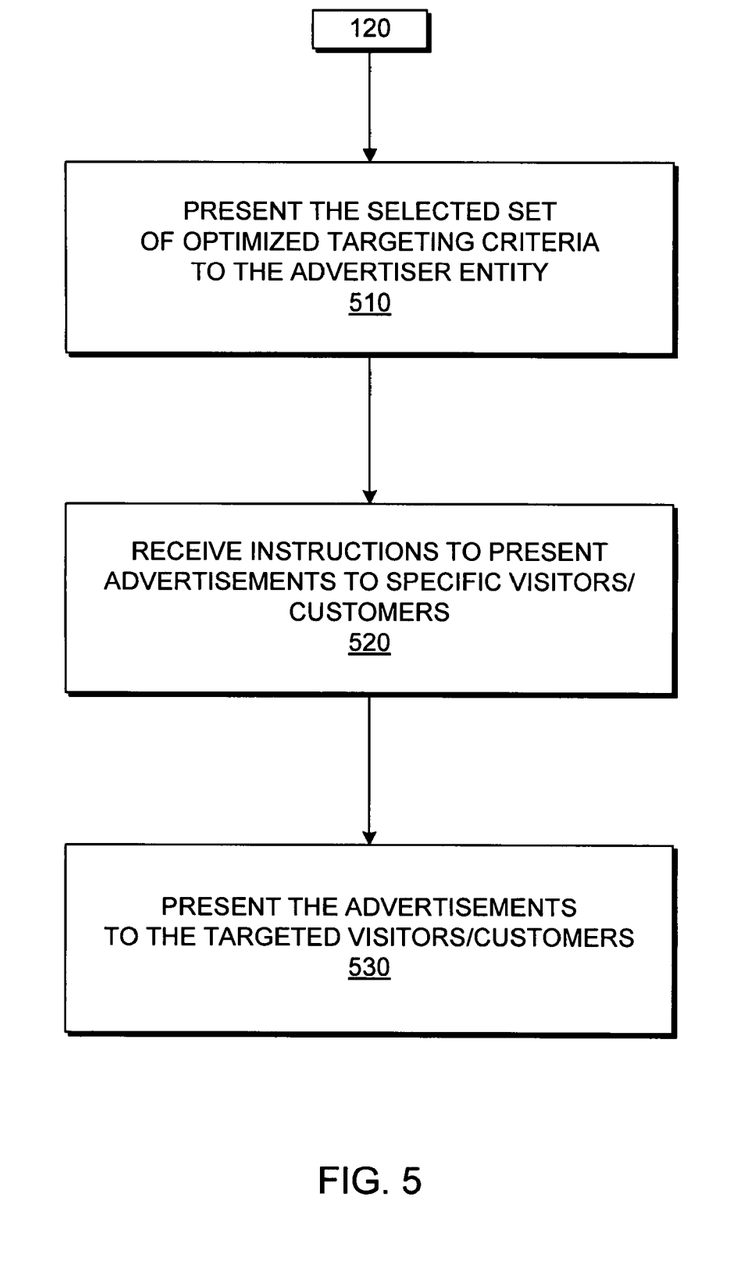
FIG. 5 is a flow diagram illustrating a method to facilitate presentation of advertisements to customers based on the selected optimized criteria, according to one embodiment of the invention.

FIG. 5 is a flow diagram illustrating one embodiment of a method to facilitate presentation of advertisements to customers based on the selected optimized criteria, as presented at processing block 130 of FIG. 2. At processing block 510, the selected set of optimized targeting criteria is presented to the advertiser entity 240. In one embodiment, the optimization platform 203 transmits the set of optimized targeting criteria to the advertiser entity 203 via the web servers 202 and the network 220, or, in the alternative, via the advertising servers 206. In another alternate embodiment, the optimization platform 203 may transmit all the ranked sets of targeting criteria to the advertiser entity 240 with specific recommendations as to the preferred optimized criteria set. The response rates for each set of targeting criteria may be also presented to the advertise entity 240 showing which areas the advertiser 240 is outperforming, matching, or underperforming the response rates of their competitors. The recommendations can thus be presented within a portfolio framework of targeting permutations, in addition of being listed in a ranked order.

At processing block 520, instructions to present advertisements to specific visitors/customers 230 are received from the advertiser entity 240. In one embodiment, the optimization platform 203 receives instructions from the advertiser entity 240 to present advertisements stored within the advertising storage module 207 to visitors/customers 230 which fit the set of optimized targeting criteria. Finally, at processing block 530, the optimization platform 203 presents the advertisements to the targeted visitors/customers 230 based on the received instructions, such as, for example, to females in the 35-45 year-old range.

Figure 6:
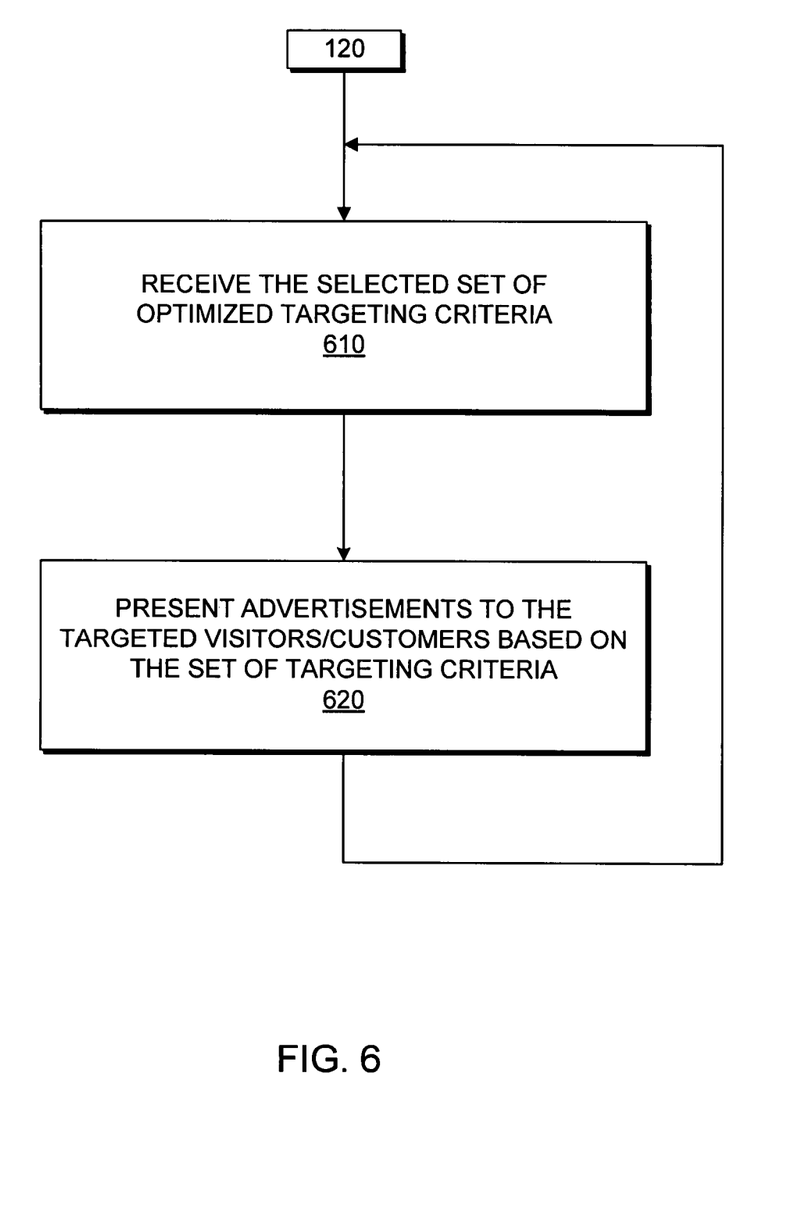
FIG. 6 is a flow diagram illustrating a method to facilitate automatic presentation of advertisements to customers based on the selected optimized criteria, according to one embodiment of the invention.

FIG. 6 is a flow diagram illustrating an alternate embodiment of a method to facilitate presentation of advertisements to customers based on the selected optimized criteria, as presented at processing block 130 of FIG. 2. At processing block 610, the selected set of optimized targeting criteria is presented to the targeting platform 204. In one embodiment, the optimization platform 203 transmits the set of optimized targeting criteria to the targeting platform 204 at predetermined periods of time.

At processing block 620, automatic presentation of advertisements is performed based on the set of optimized targeting criteria. In one embodiment, the targeting platform 204 receives the set of optimized targeting criteria and transmits advertisements stored within the advertising storage module 207 to visitors/customers 230, which fit the set of optimized targeting criteria. The procedure is subsequently repeated using a predetermined cycle time to update the set of optimized targeting criteria.

Figure 7:
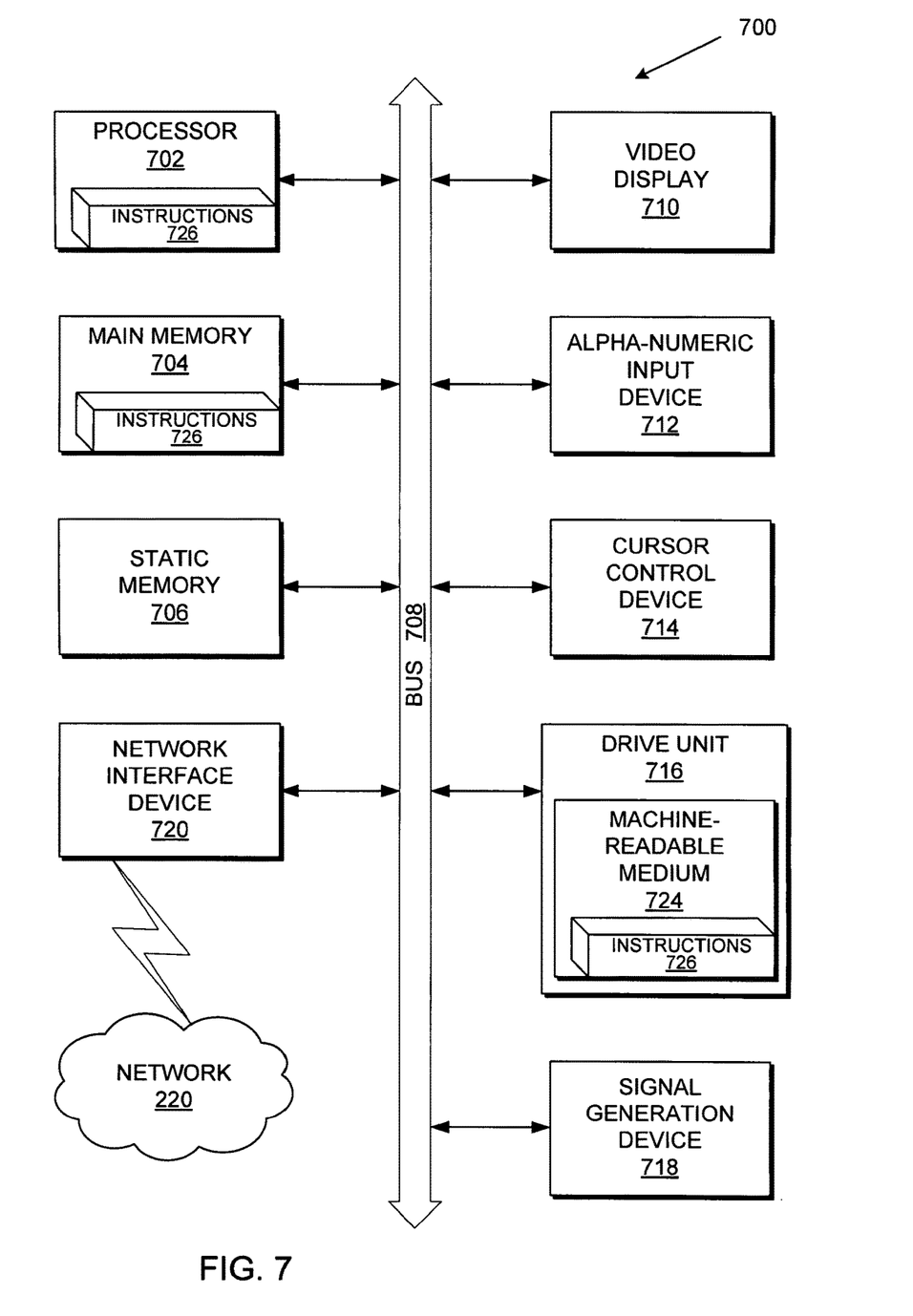
FIG. 7 is a diagrammatic representation of a machine in the exemplary form of a computer system within which a set of instructions may be executed.

FIG. 7 shows a diagrammatic representation of a machine in the exemplary form of a computer system 700 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker), and a network interface device 720.

The disk drive unit 716 includes a machine-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 720.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:

retrieving, by a content delivery system server in response to a content targeting request from an entity providing digital content, a plurality of search queries received by an online portal provider and initiated by a plurality of users of the online portal provider via a plurality of client computing devices and over an electronic communications network, the plurality of search queries being related to subject matter of interest to the entity by search keywords linked to a number of uniform resource locators (URLs) associated with the entity;

obtaining, by the content delivery system server, attribute data associated with the plurality of users, of the online portal, that initiated the plurality of search queries, wherein the attribute data comprises attributes identifying the plurality of users that initiated the plurality of search queries related to subject matter of interest to the entity;

generating, by the content delivery system server, a matrix using the attribute data identifying the plurality of users that initiated the plurality of search queries, the matrix comprising the attributes identifying the plurality of users that initiated the plurality of search queries related to the subject matter of interest to the entity;

selecting, by the content delivery system server, a plurality of sets of targeting criteria from the matrix generated using the attribute data identifying the plurality of users that initiated the plurality of search queries related to subject matter of interest to the entity, wherein a set of targeting criteria identifies a group of users, of the plurality of users that initiated the plurality of search queries, by at least one of the attributes, from the matrix of attribute data identifying the plurality of users that initiated the plurality of search queries related to the subject matter of interest to the entity, and is in accordance with goal of the entity;

retrieving, by the content delivery system server, performance parameters for each set of targeting criteria selected from the matrix, the performance parameters identifying, for each set of targeting criteria, a historical click-through rate for users with attributes identified in the set of targeting criteria;

selecting, by the content delivery system server, a set of targeting criteria, from the plurality of sets of targeting criteria selected from the matrix, selection of the set of targeting criteria being based on the performance parameters, the set of targeting criteria that is selected based on the performance parameters is related to the subject matter of interest to the entity;

selecting, by the content delivery system server, a number of users of the online portal provider, each user of the number of users selected being identified using the selected set of targeting criteria and attribute data, of the user, matching the set of targeting criteria; and transmitting, by the content delivery system server and over the electronic communications network to a number of client computing devices corresponding to the number of users of the plurality of users of the online portal provider, the digital content of the entity.

2. The method of claim 1, selection of the set of targeting criteria further comprising:
selecting a predetermined number of the top ranked sets of targeting criteria;
assigning an optimized parameter value to each set of the top ranked sets of targeting criteria; and
selecting, as the set of targeting criteria, a set of optimized targeting criteria from the top ranked sets using highest optimized parameter values.

3. The method of claim 1, the content targeting request received from the entity comprising a request for a set of optimized targeting criteria in connection with a predetermined period of time, the retrieving of the plurality of search queries further comprising using the predetermined period of time in retrieving the plurality of search queries initiated by the plurality of users.

4. The method of claim 3, the plurality of search queries retrieved being initiated by the plurality of users in the predetermined period of time.

5. The method of claim 4, retrieval of the plurality of search queries further comprising retrieving query event data comprising a plurality of search click events on a uniform resource locator (URL), of the number of URLs, associated with the entity within the predetermined period of time.

6. The method of claim 5, each search query of the plurality and each search click event of the plurality having a corresponding identification parameter associated with a user of the plurality of users.

7. The method of claim 6, the attribute data is obtained using the corresponding identification parameter.

8. The method of claim 1, for a given user of the plurality, the attribute data comprising at least one of demographic information, technographic information, context information, inferred profile information and timing information.

9. A content delivery system comprising:
a content delivery system server comprising a processor and a non-transitory computer-readable storage medium for tangibly storing thereon program logic for execution by the processor, the program logic comprising:
logic executed by the processor for retrieving a plurality of search queries received by an online portal provider and initiated by a plurality of users of the online portal provider via a plurality of client computing devices and over an electronic communications network, the plurality of search queries being related to subject matter of interest to the entity by search keywords linked to a number of uniform resource locators (URLs) associated with the entity;

logic executed by the processor for obtaining attribute data associated with the plurality of users, of the online portal, that initiated the plurality search queries, wherein the attribute data comprises attributes identifying the plurality of users that initiated the plurality of search queries related to subject matter of interest to the entity;

logic executed by the processor for generating a matrix using the attribute data identifying the plurality of users that initiated the plurality of search queries, the matrix comprising the attributes identifying the plurality of users that initiated the plurality of search queries related to the subject matter of interest to the entity;

logic executed by the processor for selecting a plurality of sets of targeting criteria from the matrix generated using the attribute data identifying the plurality of users that initiated the plurality search queries related to the subject matter of interest to the entity, wherein a set of targeting criteria identifies a group of users, of the plurality of users that initiated the plurality of search queries, by at least one of the attributes, from the matrix of attribute data identifying the plurality of users that initiated the plurality of search queries related to the subject matter of interest to the entity, and is in accordance with a goal of the entity;

logic executed by the processor for retrieving performance parameters for each set of targeting criteria selected from the matrix, the performance parameters identifying, for each set of targeting criteria, a historical click-through rate for users with attributes identified in the set of targeting criteria;

logic executed by the processor for selecting a set of targeting criteria, from the plurality of sets of targeting criteria selected from the matrix, selection of the set of targeting criteria being based on the performance parameters, the set of targeting criteria that is selected based on the performance parameters is related to the subject matter of interest to the entity;

logic executed by the processor for selecting a number of users of the online portal provider, each user of the number of users selected being identified using the selected set of targeting criteria and attribute data, of the user, matching the set of targeting criteria; and logic executed by the processor for transmitting, over the electronic communications network to a number of client computing devices corresponding to the number of users of the plurality of users of the online portal provider, the digital content of the entity.

10. The system of claim 9, the selection of the set of targeting criteria further comprising:
logic executed by the processor for selecting a predetermined number of the top ranked sets of targeting criteria;
logic executed by the processor for assigning an optimized parameter value to each set of the top ranked sets of targeting criteria; and
logic executed by the processor for selecting a set of optimized targeting criteria from the top ranked sets using highest optimized parameter values.

11. The system of claim 9, the content targeting request received from the entity comprising a request for a set of optimized targeting criteria from the entity in connection with a predetermined period of time, to retrieve retrieval of the plurality of search queries further comprising logic executed by the processor for using the predetermined period of time in retrieving the plurality of search queries initiated by the plurality of users.

12. The system of claim 11, the plurality of search queries retrieved being initiated by the plurality of users in the predetermined period of time.

13. The system of claim 12, retrieval of the plurality of search queries further comprising logic executed by the processor for retrieving query event data comprising a plurality of search click events on a uniform resource locator (URL), of the number of URLs, associated with the entity within the predetermined period of time.

14. The system of claim 13, each search query of the plurality and each search click event of the plurality having a corresponding identification parameter associated with a user of the plurality of users.

15. The system of claim 14, the attribute data is obtained using the corresponding identification parameter.

16. The system of claim 9, for a given user of the plurality, the attribute data comprising at least one of demographic information, technographic information, context information, inferred profile information and timing information.

17. A computer-readable non-transitory storage medium, having stored thereon, processor executable instructions, that when executed by a content delivery system server, perform a method comprising:

retrieving, in response to a content targeting request from an entity providing digital content, a plurality of search queries received by an online portal provider and initiated by a plurality of users of the online portal provider via a plurality of client computing devices and over an electronic communications network, the plurality of search queries being related to subject matter of interest to the entity by search keywords linked to a number of uniform resource locators (URLs) associated with the entity;

obtaining attribute data associated with the plurality of users, of the online portal, that initiated the plurality of search queries, wherein the attribute data comprises attributes identifying the plurality of users that initiated the plurality of search queries related to subject matter of interest to the entity;

generating a matrix using the attribute data identifying the plurality of users that initiated the plurality of search queries, the matrix comprising the attributes identifying the plurality of users that initiated the plurality of queries related to the subject matter of interest to the entity;

selecting a plurality of sets of targeting criteria from the matrix generated using the attribute data identifying the plurality of users that initiated the plurality of search queries related to subject matter of interest to the entity, wherein a set of targeting criteria identifies a group of users, of the plurality of users that initiated the plurality of search queries, by at least one of the attributes, from the matrix of attribute data identifying the plurality of users that initiated the plurality of search queries related to the subject matter of interest to the entity, and is in accordance with a goal of the entity;

retrieving performance parameters for each set of targeting criteria selected from the matrix, the performance parameters identifying, for each set of targeting criteria, a historical click-through rate for users with attributes identified in the set of targeting criteria;

selecting a set of targeting criteria, from the plurality of sets of targeting criteria selected from the matrix, selection of the set of targeting criteria being based on the performance parameters, the set of targeting criteria that is selected based on the performance parameters is related to the subject matter of interest to the entity;

selecting a number of users of the online portal provider, each user of the number of users selected being identified using the selected set of targeting criteria and attribute data, of the user, matching the set of targeting criteria; and transmitting, over the electronic communications network to a number of client computing devices corresponding to the number of users of the plurality of users of the online portal provider, the digital content of the entity.

18. The medium of claim 17, selection of the set of targeting criteria further comprising:

selecting a predetermined number of the top ranked sets of targeting criteria;

assigning an optimized parameter value to each set of the top ranked sets of targeting criteria; and selecting, as the set of targeting criteria, a set of optimized targeting criteria from the top ranked sets using highest optimized parameter values.

19. The medium of claim 17, the content targeting request received from the entity comprising a request for a set of optimized targeting criteria in connection with a predetermined period of time, retrieving of the plurality of search queries further comprising using the predetermined period of time in retrieving the plurality of search queries initiated by the plurality of users.

20. The medium of claim 19, the plurality of search queries retrieved being initiated by the plurality of users in the predetermined period of time.

21. The medium of claim 20, retrieval of the plurality of search queries further comprising retrieving query event data comprising a plurality of search click events on a uniform resource locator (URL), of the number of URLs, associated with the entity within the predetermined period of time.

22. The medium of claim 21, each search query of the plurality and each search click event of the plurality having a corresponding identification parameter associated with a user of the plurality of users.

23. The medium of claim 22, the attribute data is obtained using the corresponding identification parameter.

24. The medium of claim 17, for a given user of the plurality, the attribute data comprising at least one of demographic information, technographic information, context information, inferred profile information and timing information.

* * * * *